J. G. LAWLER.
CONDUIT FOR PASSENGER CAR ELECTRICAL WIRING.
APPLICATION FILED FEB. 10, 1913.
1,199,797.
Patented Oct. 3, 1916.
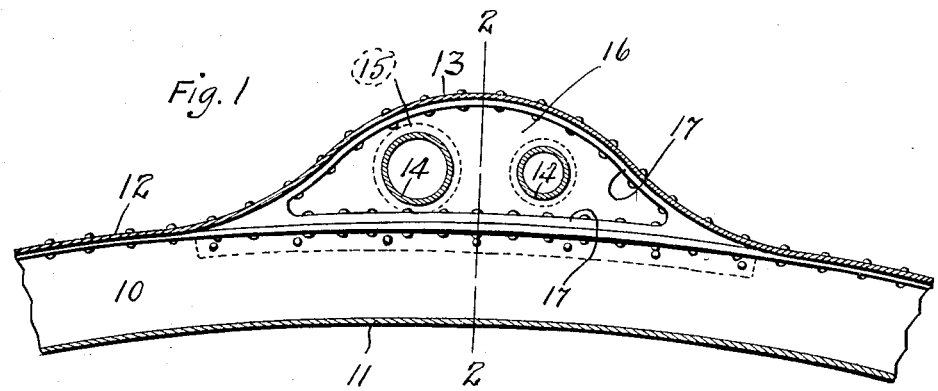
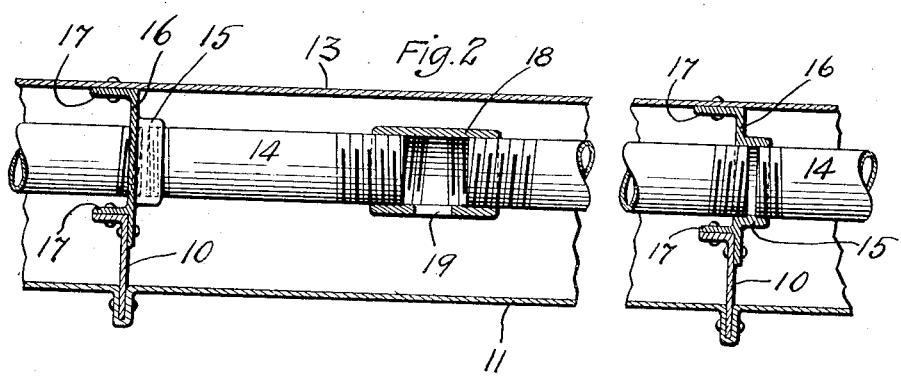
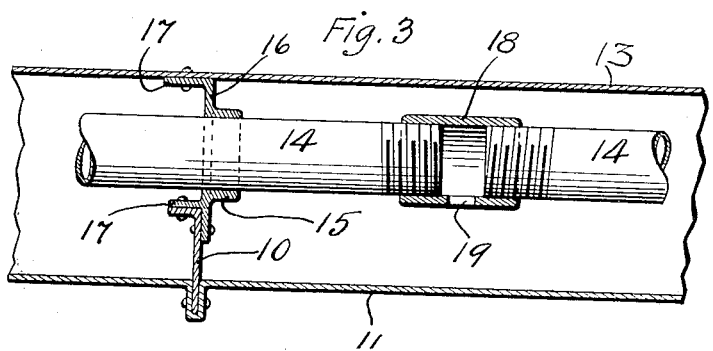
Witnesses
Inventor
James G. Lawler
By
Att'y.

UNITED STATES PATENT OFFICE.

JAMES G. LAWLER, OF ST. CHARLES, MISSOURI, ASSIGNOR TO AMERICAN CAR AND FOUNDRY COMPANY, OF ST. LOUIS, MISSOURI, A CORPORATION OF NEW JERSEY.

CONDUIT FOR PASSENGER-CAR ELECTRICAL WIRING.

1,199,797. Specification of Letters Patent. Patented Oct. 3, 1916.

Application filed February 10, 1913. Serial No. 747,364.

*To all whom it may concern:*

Be it known that I, JAMES G. LAWLER, a citizen of the United States, residing at St. Charles, Missouri, have invented a certain new and useful Improvement in Conduits for Passenger-Car Electrical Wiring, of which the following is a full, clear, and exact description, such as will enable others skilled in the art to which it appertains to make and use the same, reference being had to the accompanying drawings, forming part of this specification, in which—

Figure 1 is a cross-sectional view taken through the central portion of a car roof, and showing the conduits in position between the roof carlines and outer roof sheet. Fig. 2 is a detail sectional view taken approximately on the line 2—2 of Fig. 1. Fig. 3 is a detail section similar to Fig. 2, and showing a modified construction of the conduits.

My invention relates generally to new and useful improvements in railway passenger car construction, and more particularly to the conduits or pipes used for the electric wiring of the car lighting system, and to the arrangement of said conduits in the roof structure of the car.

Heretofore the practice has been to locate the train line wiring and circuit wiring in conduits preferably in the form of metal tubes on top of the car roof, but this construction has been found objectionable and undesirable for the reason that cinders, dust and moisture collect in the crevices or corners between the conduit and the roof and at the junction boxes and outlets, thus inducing rust of the outer roof sheet and the conduit.

The principal objects of my invention are, to arrange the main line and circuit wire conduits between the inner and outer roof sheets, thereby protecting said conduits from the action of the elements; to arrange and support the conduits so that they virtually become part of the framework of the car; to form in the central portion of the outer roof sheet a longitudinally extending arched portion which in effect constitutes a rib extending substantially the entire length of the car and which, in addition to providing a space for the conduits, combines with said conduits and with the conduit supports to form practically a ridge pole, extending from one end of the car to the other, thereby strengthening and bracing the roof structure, and further, to construct the conduits so that the same are readily accessible for the purpose of making the necessary lamp connections.

To attain the objects herein set forth I propose to space the inner and outer roof sheets a suitable distance apart and to arrange in said space the conduits which contain the electric wiring, said conduits being seated in and supported by brackets or fixtures preferably connected to the roof carlines.

The outer roof sheet is generally constructed of comparatively light-weight sheet metal, and it can therefore be readily bent to form an arch at the longitudinal center of the roof, and the space beneath the arch thus formed is occupied by the wire conduits.

To the above purposes my invention consists in certain novel features of construction and arrangement of parts hereinafter more fully described and claimed.

Referring by numerals to the accompanying drawings, 10 designates the usual roof carlines which are preferably constructed of metal, 11 the inner roof sheet and 12 the outer roof sheet. The central portion of this roof sheet 12 is bent upward a slight distance away from the central portion of the carlines 10 to form a transversely disposed arch 13, which extends from one end of the car to the other, and arranged in the space beneath this arched portion of said outer roof sheet and the carlines 10 are the wire conduits 14. These conduits, which are preferably sections of metal tubing, have their ends screw-seated in nipples 15 which are formed integral with brackets 16. These brackets are preferably cast and are of such shape as to fit snugly between the carlines and the arched portion of the outer roof sheet, and formed integral with the edges of said brackets are flanges 17 which bear directly against and are fixed to the carlines and arched portion 13 of the outer roof sheet.

As heretofore stated, the outer ends of the sections 14 of the conduits are threaded and seated in the internally threaded nipples 15, and in order to facilitate the assembling of these conduit sections, they are divided at points intermediate of the supporting brackets and connected by means of couplings 18 having right and left hand threads. These couplings are preferably provided with apertures 19 which permit branch wires to extend from the line wires within the conduits to the lamps, or other electric fixtures.

In some instances it may be found desirable to connect the adjacent ends of the conduit sections to each other at points other than the supporting brackets, and in this case the nipples or annular flanges 15 on the supporting brackets are not threaded and the conduits are extended through these non-threaded nipples and connected at the desired points by the couplings 18. This arrangement permits the use of conduit sections having greater length than the space between one or more pairs of carlines.

By arranging the wire conduits beneath the outer roof sheet the accumulation of dust, cinders and moisture on top of the roof sheet and the consequent rust thereof is avoided, the formation of an arch in the central portion of the outer roof sheet in addition to providing a space between the carlines and said roof sheet for the conduits, combines with said conduits and the conduit supports, namely, the carlines and the brackets to form a strong, rigid and substantial reinforcement, which, in effect, constitutes a ridge pole extending from one end of the car to the other, and materially strengthens and braces the entire roof structure.

It will be readily understood that minor changes in the size, form and construction of the various parts of my improved conduit can be made and substituted for those herein shown and described without departing from the spirit of my invention, the scope of which is set forth in the appended claims.

I claim:

1. In a car roof, a series of carlines, an outer roof sheet supported by said carlines and having an upwardly projecting longitudinally extending rib which is spaced apart from said carlines, and an electric wire conduit positioned in the space beneath said rib, which conduit and rib extend substantially the entire length of the car and constitute a centrally disposed reinforcement for the car roof.

2. In a car roof, a series of carlines, an outer roof sheet supported by said carlines and having an upwardly projecting longitudinally extending rib which is spaced apart from said carlines, and a sectional conduit for electric wires positioned in the space beneath said rib which conduit and rib extend substantially the entire length of the car and constitutes a centrally disposed reinforcement for the car roof.

3. The combination with car roof carlines and outer roof sheet, of brackets arranged between said carlines and roof sheet, and electric wire conduits seated in and supported by said brackets.

4. In a car roof, a series of carlines, an outer roof sheet supported by said carlines and having an upwardly projecting longitudinally disposed rib spaced apart from said carlines, an electric wire conduit positioned in the space between said carlines and roof sheet, and means in the space between the carlines and roof sheet for holding the conduit in fixed position, which rib, conduit and conduit holding means constitute a centrally disposed reinforcement for the roof structure.

5. In a car roof, the combination with carlines and an outer roof sheet, of brackets supported by and projecting upwardly from said carlines, and an electric wire conduit supported by said brackets beneath outer roof sheet.

6. In a car roof, a series of carlines, an outer roof sheet supported by said carlines and having an upwardly projecting longitudinally disposed rib spaced apart from said carlines, a sectional conduit for electric wires positioned in the space between said carlines and roof sheet, and means fixed to the carlines and to the roof sheet for engaging and holding the conduit sections in fixed position, which rib, conduit and conduit holding means constitute a centrally disposed reinforcement for the roof structure.

7. The combination with car roof carlines and outer roof sheet, of brackets supported by said carlines, which brackets support the central portion of said outer roof sheet, and electric wire conduit sections, the ends of which are seated in said brackets.

8. The combination with car roof carlines and outer roof sheet, the central portion of which latter is spaced apart from the carlines, of brackets positioned between the carlines and roof sheet, and electric wire conduit sections supported by said brackets beneath the roof sheet, which conduit sections extend lengthwise of the car.

9. The combination with car roof carlines and outer roof sheet, a portion of which is spaced apart from the carlines, of brackets fixed to the carlines and the outer roof sheet, which brackets bridge the space between said carlines and roof sheet, and an electric wire conduit positioned in the space between the carlines and the roof sheet and supported by said brackets.

10. In a car roof, carlines an outer roof sheet, an electric wire conduit and supports therefor arranged between the carlines and the roof sheet, which conduit extends substantially the length of the car roof.

11. In a car roof, carlines an outer roof sheet, a centrally arranged longitudinally extending portion of which latter is spaced apart from the carlines, and an electric wire conduit and supports therefor arranged in the space between the carlines and roof sheet, which conduit extends substantially the length of the roof.

12. In a car roof provided with carlines and an outer roof sheet, a centrally arranged longitudinally extending portion of which latter is spaced apart from the carlines, an electric wire conduit and supports therefor arranged in the space between the carlines and roof sheet, which conduit is formed in sections and extends substantially the entire length of the car roof.

In testimony whereof I hereunto affix my signature in the presence of two witnesses, this 31st day of January, 1913.

J. G. LAWLER.

Witnesses:
 JOHN W. LAWLER,
 FRANCIS C. BECHER.